3,182,801
SEWAGE TREATMENT TANK WITH AERATION
CHAMBER AND SETTLING CHAMBER
Charles Coleman Griffith, 450 Broad St.,
Falls Church, Va.
Filed May 22, 1962, Ser. No. 196,629
3 Claims. (Cl. 210—207)

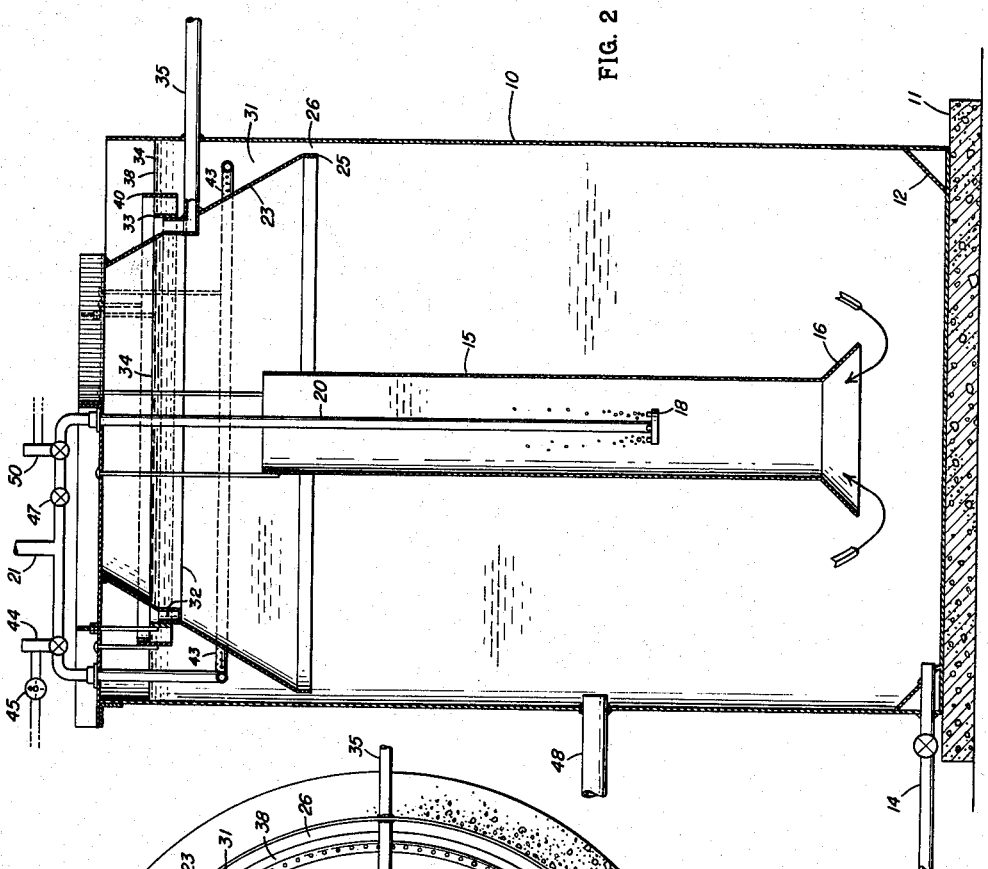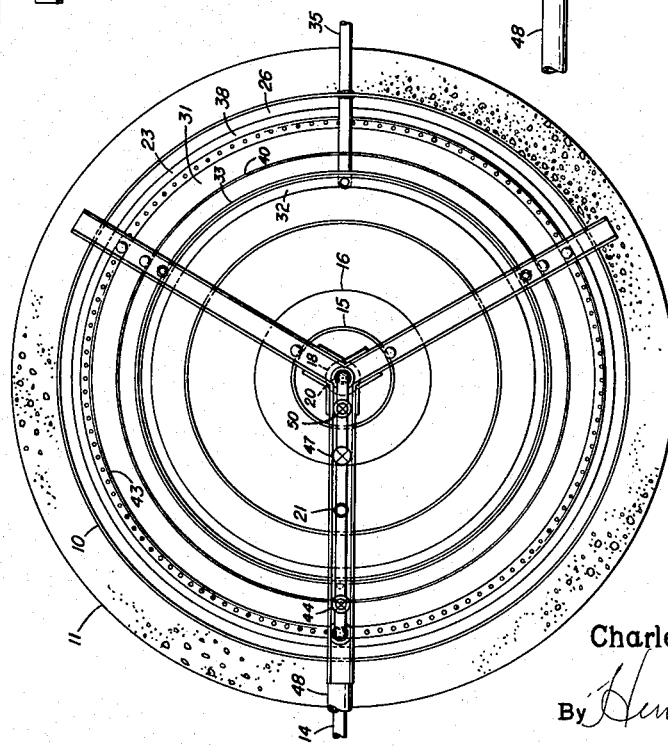

This invention relates to sewage treatment and has for its principal object the provision of a tank suitable, merely with change of size, for use as either a complete treatment plant or as a pre-treatment and aerobic digester for subsequent treatment such as by a contact aerator, a trickling filter or similar equipment.

A further object of the invention is to provide a sewage tank divided by a partition into a major aerator chamber and a considerably smaller settling chamber in which the bottom of the partition serves as a submerged weir and the effluent weir in the settling chamber is spaced from a baffle which serves as one margin of a quiescent pool located immediately above the submerged weir at the bottom of the partition.

A still further object of the invention is to provide a tank of the above type in which the length of the submerged weir is greater than the length of effluent weir so that when the discharge over the effluent weir is below acceptable loading, which may be considered to be ten thousand gallons per day per lineal foot of weir, the flow under the submerged weir at the bottom of the partition will only draw solids into the settling chamber which are smaller than the drag imposed at the effluent weir, hence the solids which will be discharged from the tank will be selective and will not include floating material, the other organic solids being kept within the aeration chamber by continuous circulation until they become reduced by bio-chemical means to gases or ash.

In the drawings:
FIG. 1 is a plan view of the tank.
FIG. 2 is a central section.

The tank 10 is partly cylindrical, supported on a concrete base 11 with its lowest edge curved as at 12 in any desirable way to facilitate removal of excess sludge which may be discharged through pipe 14. Centrally of the tank 10 is draft tube 15 having a conical skirt 16 to facilitate upward passage of sewage through the draft tube as caused by a series of air diffusers 18 fed by line 20 from any source as by pipe 21.

A frusto-conical partition 23 coaxial with the cylindrical wall 10 is mounted in the top of the tank and has a lower vertical flange 25 spaced a few inches from the cylindrical wall 10 of the tank to provide an annular passageway 26 from the lower aerator chamber. The annular trough 32 preferably carries an adjustable vertical portion 33 which acts as an effluent weir to determine the water level 34 in the tank. The effluent pipe 35 discharges fluid from the tank.

A baffle 40 coaxial with the trough and the side wall of the tank is located an appreciable distance outwardly from the effluent weir 33 and forms a quiescent pool 38 between it and the wall of the tank. This baffle is of considerable importance as any matter passing upwardly through the annular passageway 26 moves slower and slower as it ascends because of the constantly greater horizontal area of the settling chamber 31, thus allowing the vertical component of force on a rising particle to dominate an over decreasing horizontal component of force on that particle, thus causing its direction of travel to be essentially vertical and with a minimum amount of horizontal deflection. Hence there is no tendency for floating particles to pass inwardly into the space between the weir 33 and the baffle 40, this space carrying the fluid which will finally be discharged through pipe 35.

The floating matter which collects in the quiescent pool may be removed in any manner but preferably an annular perforated pipe 43 in the settling chamber is governed by a solenoid valve 44 operated by a timer 45. The timer 45 only operates at periods of low flow at which time air to diffusers 18 is shut off by the loss of pressure caused by the automatic escape of air through hand throttle valve 47 exhausting to the atmosphere as permitted by the opening of solenoid valve 50 which in turn causes the water level to drop in both chambers thus preventing the flow of liquids or solids over weir 33 while with normally closed solenoid valve 44 open there is created great turbulence in quiescent pool 38 so as to release by agitation entrained gases causing the loss of buoyancy of approximately all of the floating matter, then with the closing of solenoid valve 44 and prior to the flow of air through solenoid valve 50, time is allowed for the degasified matter to settle downwardly back through the annular passageway 26 after which period pressure air once more passes through diffusers 18.

The tank shown may be used as a complete treatment plant in which case it will be quite large, but when used as a pre-treatment aerobic digester to be followed by subsequent treatment, the tank may be much smaller. In its pre-treatment use the pipe 35 will lead to a suitable mechanism outlet, a trickling filter, a contact aerator or any other desired type of sewage treatment which treats material bio-chemically in any conventional manner, the sewage sludge thus produced being returned to the aerator chamber for digestion. In either use of the tank it is rather immaterial where the incoming sewage is admitted. It might be through the opening at the top of the conical partition 23 but is shown as entering through pipe 48 at about the middle of the vertical draft tube 15.

What I claim is:
1. A cylindrical sewage tank having therein a coaxial frustoconical partition dividing the interior of the tank into a major chamber below and a minor chamber above, said partition being spaced from the tank wall to provide a narrow annular intake passage from the major chamber to the minor chamber, the bottom of the partition forming a submerged weir, an effluent weir in the minor chamber coaxial with the partition, means for causing a constant upward flow of air axially in the major chamber to cause it to be an aeration chamber, a circular baffle in the minor chamber forming with the tank wall an annular quiescent pool located directly above the annular intake passage and spaced outwardly from the effluent weir, whereby all floating material entering the minor chamber will pass directly upward into said quiescent pool thus leaving the flow inwardly over the effluent weir free of floating material.

2. The tank of claim 1 in which the peripheral length of the submerged weir is greater than the peripheral length of the effluent weir, whereby travel upwardly of a particle passing through said annular passage will be a constantly slower rate and will have a consequent minimum amount of horizontal deflection.

3. A sewage tank having a cylindrical shell and an exit passageway leading therefrom, a frusto-conical partition coaxial with the shell and having its larger diameter end down and proximate the shell to form an annular intake from a lower aeration chamber to an upper settling chamber of constantly increasing horizontal area upwardly, an annular trough forming an effluent weir coaxial with the partition, and communicating with the exit passageway, the bottom of said partition forming a submerged weir, an annular baffle extending above the water level determined by the trough weir and having its bottom edge below said water level thus forming a quiescent pool between the shell and the baffle, a draft tube coaxial with the sewage tank, an air diffuser within the draft tube for causing an upward flow of sewage within the draft tube and a downward flow between the draft tube and the shell, the horizontal annular area between the baffle and the trough weir being greater than the horizontal area of the annular intake, whereby floating matter passing upward from the annular intake will pass vertically to said quiescent pool and the peripheral length of the submerged weir adjacent said annular intake is greater than the peripheral length of the weir at the trough so that with a flow at the trough weir less than the acceptable loading, undesired organic particles will not pass from the aeration chamber into the upper settling chamber but will continue to circulate in the aeration chamber.

References Cited by the Examiner
UNITED STATES PATENTS

| | | | |
|---|---|---|---|
| 1,343,797 | 6/20 | Stott et al. | 210—14 |
| 2,324,593 | 7/43 | Persson et al. | 210—14 |
| 2,717,873 | 9/55 | Montgomery et al. | 210—197 |
| 2,897,149 | 7/59 | Griffith | 210—13 XR |
| 2,987,186 | 6/61 | Burgoon et al. | 210—15 XR |
| 3,043,433 | 7/62 | Singer | 210—197 |

MORRIS O. WOLK, *Primary Examiner.*